United States Patent
Sella et al.

(10) Patent No.: US 10,346,258 B2
(45) Date of Patent: Jul. 9, 2019

(54) INTELLIGENT BACKUP SYSTEM

(71) Applicant: Cisco Technology, Inc., San Jose, CA (US)

(72) Inventors: Yaron Sella, Beit Nekofa (IL); Yigal Reiss, Jerusalem (IL); Len Sundy, Ramat Beit Shemesh (IL); Yair Mirsky, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 238 days.

(21) Appl. No.: 15/218,342

(22) Filed: Jul. 25, 2016

(65) Prior Publication Data
US 2018/0024893 A1    Jan. 25, 2018

(51) Int. Cl.
| G06F 17/30 | (2006.01) |
| G06F 11/14 | (2006.01) |
| G06N 7/00 | (2006.01) |
| G06F 21/55 | (2013.01) |
| G06F 21/56 | (2013.01) |

(52) U.S. Cl.
CPC ........ G06F 11/1458 (2013.01); G06F 21/554 (2013.01); G06F 21/56 (2013.01); G06N 7/005 (2013.01); G06F 2221/034 (2013.01)

(58) Field of Classification Search
CPC .... G06F 11/1458; G06F 21/56; G06F 21/554; G06F 2221/034; G06N 7/005
See application file for complete search history.

(56) References Cited

U.S. PATENT DOCUMENTS

| 8,069,484 | B2 | 11/2011 | McMillan |
| 8,495,037 | B1* | 7/2013 | Westerberg ......... G06F 11/1448 707/698 |
| 8,856,542 | B2 | 10/2014 | Tatarinov et al. |
| 9,256,635 | B2 | 2/2016 | Czarny et al. |
| 9,317,686 | B1* | 4/2016 | Ye ..................... G06F 11/1461 |
| 2008/0047013 | A1* | 2/2008 | Claudatos ............. G06F 21/562 726/24 |
| 2013/0104189 | A1 | 4/2013 | Drako |
| 2014/0331324 | A1 | 11/2014 | Stolfo et al. |
| 2015/0172304 | A1 | 6/2015 | Kleczynski |
| 2016/0378988 | A1* | 12/2016 | Bhashkar .............. G06F 21/566 726/24 |

OTHER PUBLICATIONS

International Search Report and Written Opinion, dated Oct. 6, 2017, cited in a counterpart WO application (PCT/IB2017/054358).
(Continued)

*Primary Examiner* — Greta L Robinson

(57) ABSTRACT

In one embodiment, a method for ransomware-aware file backup is implemented on a computing device and includes: backing up a target population of files from a target file location in a backup transaction, computing a backup delta score for the backup transaction, where the computing comprises comparing backup data from the backup transaction with backup data from a previous backup transaction, determining whether the computer backup delta score exceeds a pre-defined threshold, and upon the computed backup delta score exceeding the pre-defined threshold: determining that the backup transaction is indicative of a ransomware infection, and performing at least one countermeasure in response to the ransomware infection.

20 Claims, 4 Drawing Sheets

(56) References Cited

OTHER PUBLICATIONS

Ahmadian, Mohammed Mehdi et al.; Connection-Monitor & Connection-Breaker: A Novel Approach for Prevention and Detection of High Survivable Ransomwares, Information Security and Cryptology (ISCISC), 2015 12th Int'l tranian Society of Cryptology Conference on, Rasht, 2015, pp. 79-84.
Allievi, Andrea et al.; Treat Spotlight: Teslacrypt—Decrypt it Yourself (Apr. 27, 2015). Cisco Blog, Talos Group Can be seen at: http://blogs.cisco.com/security/talos/teslacrypt.
Danielson, Tess; The FBI Says You May Need to Pay Up if Hackers Infect Your Computer with Ransomware (Oct. 26, 2015) Can be seen at: http://www.businessinsider.com/fbi-recommends-paying-ransom-for-infected-computer-2015-10.
Floyd, Lauren; Ask the Engineer: Why Dropbox Won't Help if You're the Victim of Cryptowall, posted 5 in Tech Newon Mar. 5, 2015.
Saiyed, Carl; CRYPTOLOCKER (2016) ISSA Journal Apr. 16, pp. 14-18.

* cited by examiner

INTELLIGENT BACKUP SYSTEM

FIELD OF THE INVENTION

The present invention generally relates to backup systems.

BACKGROUND OF THE INVENTION

Ransomware is malicious software designed to block access to a computer system or a part thereof until a "ransom", typically a monetary sum, is provided by the owner or user of the computer. Ransomware has been steadily increasing as a threat to safe computing. One of the most common types of ransomware entails the encryption of some, or all, of the files on computer system, where a ransom is demanded in exchange for a decryption key to decrypt the files.

The level of encryption typically used by ransomware generally precludes decryption of the affected files on a victim's computer system without possession of the encryption key. Accordingly, anti-ransomware strategy tends to focus on prevention, i.e., denying initial access to the targeted computer system, and recovery, i.e., restoring/replacing the files that have been encrypted.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for ransomware-aware file backup is implemented on a computing device and includes: backing up a target population of files from a target file location in a backup transaction, computing a backup delta score for the backup transaction, where the computing comprises comparing backup data from the backup transaction with backup data from a previous backup transaction, determining whether the computer backup delta score exceeds a pre-defined threshold; and upon the computed backup delta score exceeding the pre-defined threshold: determining that the backup transaction is indicative of a ransomware infection, and performing at least one counter-measure in response to the ransomware infection.

Description

It will be appreciated by one of ordinary skill in the art that automatic synchronizing of user files to the cloud (using services such as, for example, Dropbox, Google-drive, etc.) may not be relied upon to facilitate recovery from ransomware. In fact, such synchronization may actually serve to further propagate the problem, since the encrypted files from the "infected" computer system may be uploaded to the cloud, thereby "contaminating" the cloud-based file versions as well. Accordingly, to be effective, recovery from ransomware may be based on an intelligent backup system that is ransomware-aware.

Figure 1:
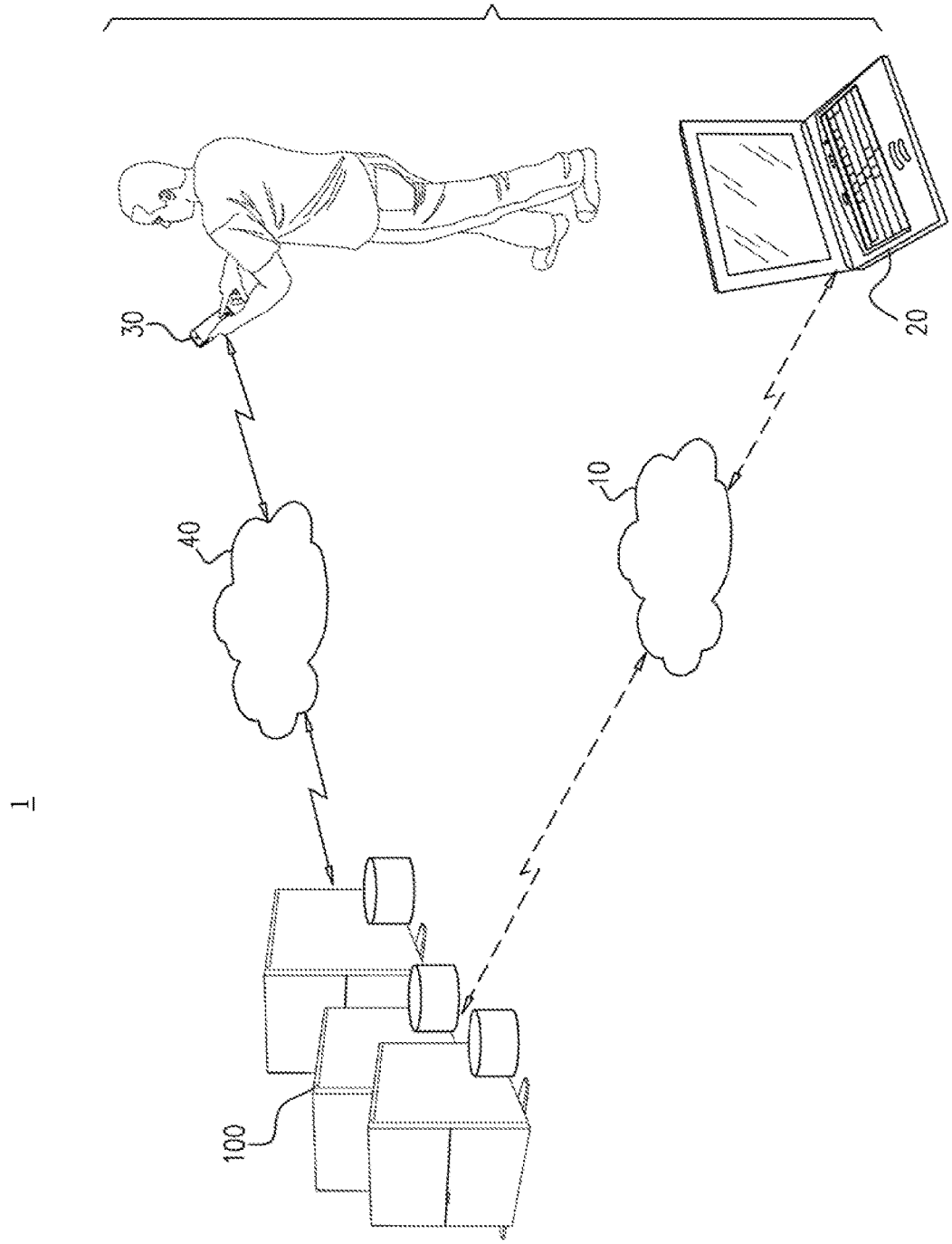
FIG. 1 is a schematic illustration of an exemplary intelligent backup system, constructed and operative in accordance with embodiments described herein.

Reference is now made to FIG. 1, which illustrates an exemplary intelligent backup system 1, constructed and operative in accordance with embodiments described herein. System 1 comprises intelligent backup server 100 which is arrayed to communicate with one or more client computing devices 20 and associated client communication devices 30, where client communication devices 30 are employed to communicate with authorized users/administrators of client computing devices 30. In accordance with the exemplary embodiment of FIG. 1, intelligent backup server 100 may communicate with client computing device 20 via a communications network 10, such as, for example, the Internet. Intelligent backup server 100 may communicate with client communication device 30 via communications network 10, and/or another communications network, such as, for example, mobile network 40. It will be appreciated by one of ordinary skill in the art that the depiction of networks 10 and 40 as two separate networks is an exemplary embodiment. The embodiments described herein may also support similar communication to both client computing device 20 and client communication device 30 via a single such network, e.g., both may communicate using Internet 10 or mobile network 40. The embodiments described herein may also support communication via other types of communications networks, for example, but not limited to, a "plain old telephone service" (POTS) network.

In accordance with embodiments described herein, intelligent backup system 1 may provide protection against ransomware by preventing infection of backed-up copies of client computing device 20. Similar to typical backup systems, intelligent backup system 1 is configured to keep multiple backup copies. Intelligent backup system 1 is further configured to check each "backup-transaction" (hereafter, "transaction"), either scheduled or manual, in order to assess a likelihood for whether or not any of the files in the current backup transaction (i.e., the files currently being backed up) have been contaminated by ransomware. For each transaction, intelligent backup server 100 is configured to compute and maintain a "delta-score" that represents changes in the characteristics of the current backup vis-à-vis the files backed up in a previous transaction. Accordingly, the delta-score may be derived by first scoring one or more of a series of scoring factors for some, or all, of the files backed up in a given backup transaction, and then comparing the resulting scores with those received from one or more previous backup transactions. It will be appreciated that there is no previous transaction for comparison at the time of the first backup transaction for client computing device 20. For first-time backup transactions, the delta-scores may be derived in comparison with pre-configured default values that represent scores that may be typical for a client computing device 20 that is not infected by ransomware.

As detailed hereinbelow, the delta-score may be computed according to one, some, or all, of a number of scoring factors, such as, for example: a number of new files in the backup transaction; a number of old files missing from a previous backup transaction; a number of files that have been modified since a previous transaction; file access patterns for modified, new, or deleted files; the entropy level of the files included in a transaction; etc.

For example, the number of new files appearing in the transaction may be indicative of a ransomware infection. For example, some ransomware infections generate a new file in every infected folder/directory. A marked increase in the number of new files in a transaction may therefore be indicative of a ransomware infection. This scoring factor may be a function of the absolute number of files backed up in a given transaction, or in comparison to previous transactions. It will be appreciated that legitimate software applications may also add multiple files, e.g., a photo management software application may produce index files. Accordingly, when computing the score there may be a compensation factor to account for specific known software applications and their known behaviors. A score based on the number of new files backed up may also be assigned progressively, where a series of new file thresholds may be defined, such that the scoring factor may increase as the number of new files increases. Alternatively, or in addition, the percentage of new files in the transaction vis-à-vis the total number of files on client computing device 20 may also be scored.

The number of old files, i.e. files backed up (or at least scanned for backup) in a previous transaction, missing from the transaction may also be scored. For example, in some ransomware attacks, some filenames may be changed, e.g., the filename extension may be changed to ".enc" to indicate that the file is now encrypted. Similarly, some ransomwares may append an additional filename extension to an original filename after encrypting the targeted file. Such filename changes may create the virtual illusion of "missing" files, as the original filenames with file suffixes such as ".docx", ".jpeg", etc. now appear to be missing. Scoring for missing files may be implemented in a generally similar manner as for new files. Accordingly, this scoring factor may be a function of the absolute number of missing files detected in a given transaction, or in comparison to previous transactions. A score based on the number of missing files may also be assigned progressively, where a series of missing files thresholds may be defined, such that the scoring factor may increase as the number of missing files detected increases. Alternatively, or in addition, the percentage of missing files detected in the transaction vis-à-vis the total number of files on client computing device 20 may also be scored.

The number of files that have been modified between successive transactions may also be scored. One or more indicators may be used to determine whether a file has been modified. Built-in file system indicators may be employed, for example, whether or not an archive bit has been set. Alternatively, or in addition, a difference in file size may serve to indicate that a file has been modified. Alternatively, or in addition, the contents of a file may be hashed and the result compared to that derived in the previous transaction. Alternatively, or in addition, a file size delta score may be computed for files that have been modified. The file size delta score may be computed either as a percentage or absolute change in file size, where a recurring file size delta score across a significant number of files is indicative of a systemic modification of the affected population that may not occur under normal operating circumstances.

File access patterns for modified, new, or deleted files may also be scored. It will be appreciated that the manner or sequence in which access requests to add, modify, delete, or overwrite files are performed may be indicative of activity by a malicious agent (e.g. ransomware). It may be possible to identify the pattern used by certain agents according to a request "footprint", and identification of these patterns may impact the scoring. File-type conformance may also be scored For example, different file types, such as ".jpeg", ".mp4", ".doc", ".xls", etc., may each have a certain, known structure for headers, footers, etc. Accordingly, if a file's "file signature" does not conform to an expected, known structure, it may also be indicative of a ransomware infection.

The entropy level of the files included in the transaction may also be scored relative to an expected entropy level based on file type. It will be appreciated by one of ordinary skill in the art that the entropy of encrypted data may tend to be different than that of pictures, video, etc. It will similarly be appreciated that the greater the sample size of the files to be scored, the greater the likelihood that an increase in observed entropy consistent with encrypted files may be indicative of aransomware infection. Alternatively, or in addition, the compressibility of files in the backup transaction may be scored to detect encrypted files. Backup systems, such as system 1, are often configured to compress non-compressed files (e.g., pictures, movies, etc.) in order to save storage space. However, when files are encrypted, they may become uncompressible. A high delta-score for non-compressible files may therefore be indicative of an increase in encrypted files, which in turn may be indicative of a ransomware infection.

The scoring may be additionally weighted on a per file, or per file type, basis. For example, the time since the last modification of a file may also be factored into the scoring; i.e., if an individual file has not been modified for a very long time, then its modification may be weighted to reflect a higher score. Similarly, modification of a file in a directory or folder in which file modification is rare or previously non-existent, such modification may be weighted to reflect a higher score. File-type may also be factored in. For example, files for media content and images, e.g., MPEG and JPEG files, tend to be less frequently modified than word processing and spreadsheet files, e.g., Microsoft Word® and Excel® files. File modifications may also be weighted according to file attributes. For example, operating system files and/or file locations, e.g., file system directories, folders, volumes, etc., may be marked as system files and/or have a "hide" attribute set. Modification of such files may be weighted to reflect a higher score. Weight may also be increased for specific files that have been designated as "important", either explicitly by the user, or as deduced by system 1 based on various factors such as the amount of activity on the file, its file type/location, and/or combination thereof.

The scoring process may also be implemented in such a manner that a single specific event in the transaction may be sufficient to indicate that client computing device 20 has been infected by ransomware. For example, ransomwares typically save at least one file with a message for the user of client computing device 20, i.e., a "ransom note" for the user that provides instructions how to pay a ransom for the decryption key. System 1 may be implemented with a list of known ransomware ransom notes. Detection of such a file during a transaction generally indicates that a ransomware infection is in progress.

System 1 may benchmark and/or maintain scoring histories of delta-scores on a per individual user basis. It will be appreciated that usage patterns and individual preferences may differ according to the backup user. If the delta-score for the current transaction is significantly higher than previous, typical delta-scores of that user, system 1 is configurable to provide a variety of responses under the assumption that the originating PC has been contaminated by ransomware.

System 1 may alert the backup user (and/or another user designated to receive the alert) via text message, email, instant message (IM) regarding the suspected ransomware infection. The alert may also include pertinent details such as, for example, specific files, file locations, applications, etc. suspected of being infected. System 1 may also compute a confidence score based on one or more of the delta-scores details that represents an assessment of how likely it is that the alert does not represent a false-positive diagnosis. For example, if (as per the operation of some ransomwares) a ransom note is found in every folder/directory of the file system, the confidence score may be 100%. Similarly, some ransomwares, such as, for example, "CryptoRoger", may uniformly append the same filename extension, e.g., ".crp-trgr" for files encrypted by CryptoRoger, to each encrypted file. In contrast, if, for example, the alert was triggered by a relatively higher than normal number of file modifications, the confidence score may be lower; how much lower, may be a function of the margin by which the observed file modifications exceeded the normal number.

System 1 may also provide an interactive graphical user interface (GUI) accessible by the alerted user to facilitate examination of the transaction details and/or the causes for the high delta-score. The user may use the GUI to provide instructions to system 1 regarding the disposition of the backup from the transaction and/or changes in policy going forward. In the event that a file restore is to be performed (either as determined autonomously by system 1 and/or in response to a proactive instruction from the user), the user may also use the GUI to select to perform the restore from among stored backup versions. It will be appreciated that user authentication may be required in order to approve the deletion or overwriting of existing files. Furthermore, bulk deletions or overwrites may require higher levels of authentication (e.g. a multi-step authentication). It will further be appreciated that system 1 may caution the user to access the GUI from a non-compromised device, i.e., not from client computing device 20. In accordance with some embodiments, system 1 may be configured to refuse access to the GUI from client computing device 20.

System 1 may be configured to implement a variety of counter-measures described hereinbelow in response to the indicated infection. It will be appreciated by one of ordinary skill in the art that such measures may be implemented as per the instructions provided via the GUI. Alternatively, some, or all, of the following measures may be implemented autonomously by system 1.

System 1 may increase the number of saved backup versions that are stored by system 1, i.e., the file backup from the current transaction may be accepted and stored by system 1, but unlike the usual case, an older file backup may not be erased. For example, if system 1 is configured to save the five previous backups, going forward (or at least until otherwise instructed) it may now save the previous six backups. It will be appreciated that in such manner, this measure may counter an attack that is timed to slowly infect client computing device 20 while all previous valid backups are deleted according to a standard operating procedure. It will similarly be appreciated that system 1 may continue to increase the number of saved backup versions in response to continued indications of infection in succeeding backup transactions.

In some cases, System 1 may ignore requests to delete or overwrite backup files(s). It will be appreciated by one of ordinary skill in the art that backup protocols often comprise a schedule for saving a set of recent backup versions (i.e., "generations"), as each new version is saved, the oldest version is discarded. If, as indicated by the computed delta scores, client computing device 20 is indeed infected, keeping unmodified older versions may be useful for recovery. Accordingly, in some cases, system 1 may be configured to ignore a specific deletion/overwrite request that is received from client computing device 20. Non-performance of the requested action may or may not be reflected to the entity making the request, i.e., client computing device 20; thereby keeping such information from the attacking infection (and thusly forestalling the performance of counter measures by the infection).

System 1 may also provide support recovery from a ransomware situation. For example, system 1 may be configured to determine a most recent "trusted" baseline backup version based on historical delta-scores computed as per the description hereinabove. Such determination may comprise pinpointing a date in which the scoring pattern began to change significantly. System 1 may also be configured to identify and report the time-window (using the same method), in which the ransomware has infected the machine. This may be leveraged by downstream functionality for tracking the ransomware's distribution.

Some ransomwares may be configured to prevent regularly scheduled backup transactions from happening. If successful, this attack-vector may prevent up-to-date backups. Accordingly, at least to some extent, return to a non-infected state once the infection spreads and some or all of the files on client computing device 20 are encrypted may not be feasible.

In response to this attack-vector, system 1 may be configured to send an alert to the user (or administrator) of client computing device 20 user or client communication device 30 (e.g., by email, SMS, IM, etc.) if a scheduled backup is cancelled, or otherwise did not complete successfully. Similarly, system 1 may send an alert to the user if the number of transactions performed is significantly lower than usual. System 1 may also be configured to employ known methods to perform attestation vis-à-vis the backup client on client computing device 20 to ensure it is genuine, and has not been infected or "spoofed" by ransomware. Non-performance of regularly scheduled backups may also be included as a scoring factor when deriving a delta-score for a backup transaction, i.e., a change in the direction of performing fewer backup transactions may be indicative of infection.

As noted hereinabove, system 1 may be configured to enable users to designate one or more files, file locations, and/or file types as "important". System 1 may also enable users to designate specific files, file locations, and/or file types as "read-only". It will be appreciated that deletion/modification of read-only files is indicative (although not necessarily conclusively) of infection of client computing device 20.

When a request is made to modify/delete or change the status of a read-only file or an important file, system 1 may amplify the delta-score for the transaction (e.g., by increasing the weight assigned to the read-only file). In addition, system 1 may inform the user that such a change was made (e.g., via email, text message, IM, etc.) and accept and implement the user's instructions in response. For example, the modification/deletion request may be denied entirely. Alternatively, the implementation of the request may be delayed until an instruction from the user arrives, depending on policy and/or storage/space considerations. In accordance with some embodiments described herein, system 1 may be configured to request two factor authentication by the authorized user before performing such an instruction.

System 1 may provide added processing for important files. For example, system 1 may run more checks when such a file changes. The threshold for indicating that the target computer system (e.g., client computing device 20) is infected with ransomware may also be lower under the assumption that for important files a user may be more tolerant to a false positive outcome, than to a false negative outcome. An important file may also be specifically targeted by ransomware such that from a cost/effective standpoint, system 1 may invest more resources in the protection of an important file. System 1 may also have different rules for contacting the user when an important file is affected. System 1 may also backup such files more often, and/or save more backup history for such files in order to facilitate recovery to any point in time.

Figure 2:
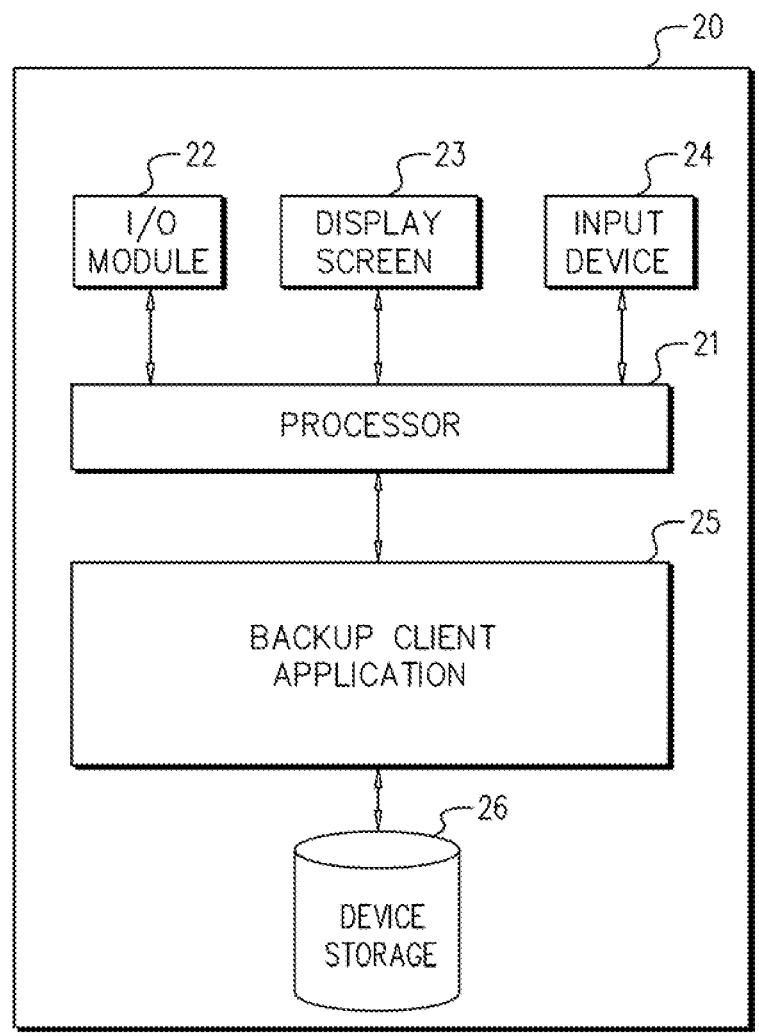
FIG. 2 is a schematic illustration of the client computing device of FIG. 1.

Reference is now made to FIG. 2 which is a schematic illustration of client computing device 20 constructed and operative in accordance with embodiments described herein. Client computing device 20 comprises processor 21, I/O module 22, display screen 23, input device 24, backup client application 25, and device storage 26. It will be appreciated that client computing device 20 may comprise other components such as may be required to provide operational functionality.

I/O module 22 may be any suitable software and/or hardware component such as a transceiver or network card that may be operative to use protocols such as are known in the art to at least send and receive backup transaction data to and from intelligent backup server 100 (FIG. 1). It will be appreciated that display screen 23 may be functional to provide visual output to a user of client computing device 20. It will further be appreciated that display screen 23 may be implemented as either an integrated component of client computing device 20 or an attached peripheral device. Input device 24 may be any suitable device or functionality for the input of user instructions to client computing device 20, e.g., a keyboard, mouse, pointing device, or touchscreen functionality to be entered via display screen 23.

It will be appreciated that client computing device 20 may comprise more than one processor 21. For example, one such processor 21 may be a special purpose processor operative to at least execute backup client application 25. Backup client application 25 may be operative to provide scheduled and/or ad hoc backup of data from device storage 26.

In accordance with embodiments described herein, client communication device 30 may be generally similar in structure to client computing device 20.

Figure 3:
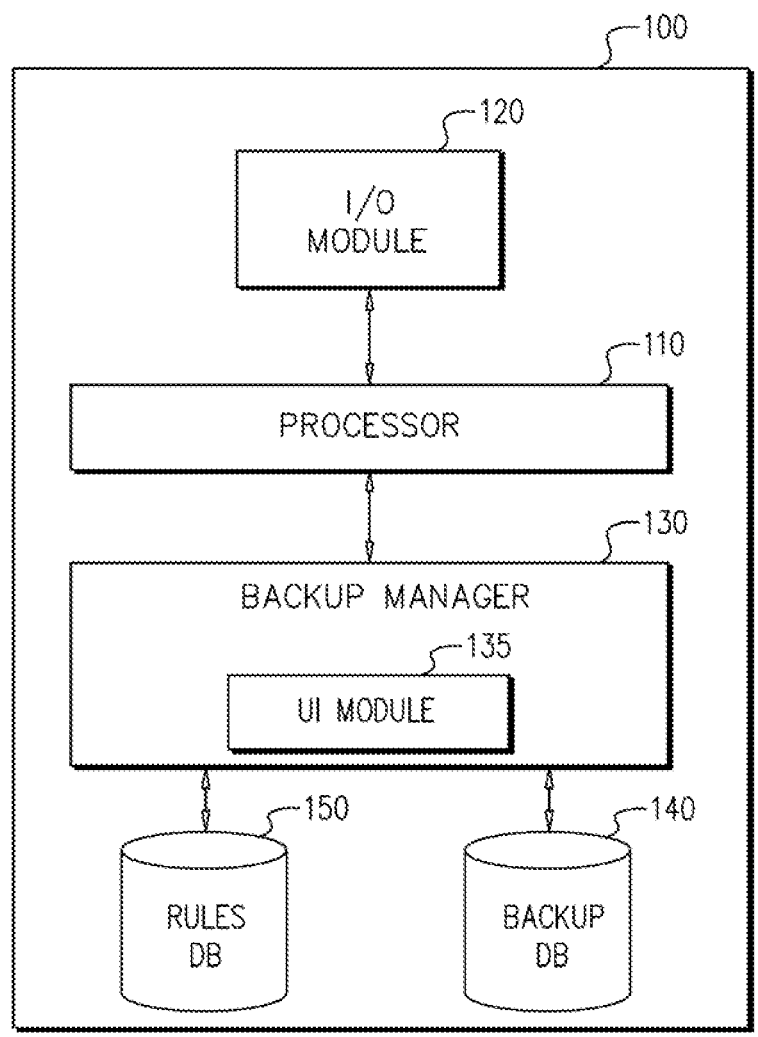
FIG. 3 is a schematic illustration of the intelligent backup server of FIG. 1.

Reference is now made to FIG. 3 which is a schematic illustration of an intelligent backup server 100, constructed and operative in accordance with embodiments described herein. Intelligent backup server 100 comprises processor 110, I/O module 120, and backup manager 130. It will be appreciated that intelligent backup server 100 may comprise other components such as may be required for the backup of files from a client system such as, for example, client computing system 20. It will similarly be appreciated that the depiction of intelligent backup server 100 as a single entity with integrated components may be exemplary. In some embodiments of the present invention, the functionalities of some or all of the components of intelligent backup server 100 may be distributed in separate units or modules. In accordance with some embodiments of the present invention, some or all of the components of intelligent backup server 100 may be cloud-based and accessible via a communications network such as, for example, a LAN, WAN or the Internet.

Intelligent backup server 100 comprises hardware and software components, such as are well-known in the art. I/O module 120 may be any suitable software or hardware component such as a transceiver or network card that may be operative to use protocols such as are known in the art to send and receive backup transaction data to and from client computing device 20 (FIG. 2). It will be appreciated that intelligent backup server 100 may comprise more than one processor 110. For example, one such processor 110 may be a special purpose processor operative to at least execute backup manager 130.

Backup manager 130 may be a software application that may be executed by processor 110 in order to at least perform an intelligent backup method for backing up client computing device 20. Alternatively, backup manager 130 may be implemented as a hardware component. Backup manager 130 is operative to save backup transaction files in backup database 140. Backup manager 130 is further operative to employ scoring rules from rules database 150 to score backup transactions. It will be appreciated that different scoring rules may be defined for use with different client computing devices 20. It will similarly be appreciated that different rules may be defined and applied on a per file/file type/file location basis for a given client computing device 20 as described hereinabove in more detail with reference to FIG. 1. It will also be appreciated that default rules may be defined for use in the absence of specific rules for a given file/file type/file location. It will further be appreciated that at least some of the functionality described herein for backup manager 130 may be implemented in client backup application 25.

Backup manager 130 may comprise user interface (UI) module 135. UI module 135 may be a software application and/or hardware component that is operative to facilitate entry of instructions and/or rule definitions by an authorized user associated with client computing device 20. It will be appreciated that the authorized user may be the end user of device 20 and/or an authorized user associated with the ongoing operation of system 1.

Figure 4:
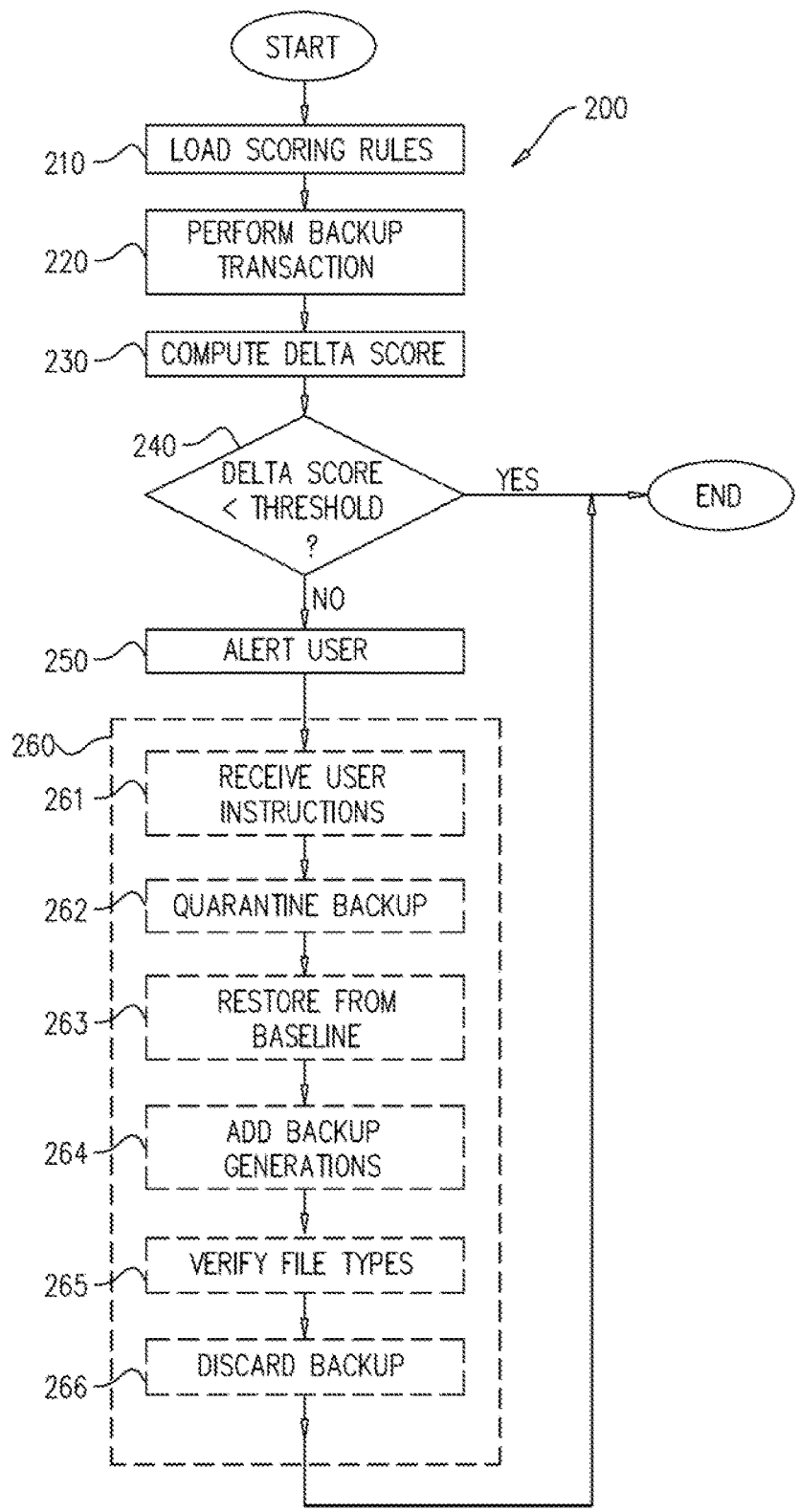
FIG. 4 is a flow chart of an intelligent backup process to be performed by the backup server of FIG. 3.

Reference is now also made to FIG. 4 which is a flowchart of an intelligent backup process 200 to be performed by backup manager 130 (FIG. 3) in accordance with embodiments of the present invention. Backup manager 130 may load (step 210) scoring rules for the backup transaction from rules database 150. Alternatively, or in addition, backup manager 130 may employ a set of standard or default rules for the backup transaction. The scoring rules may represent the thresholds and weights for the scoring factors described hereinabove.

Backup manager 130 employs I/O module 120 to perform (step 220) the backup transaction i.e., to receive copies of files from client computing device 20. In practice, the files backed up in a given transaction may represent all of the files on client computing device 20, or a subset thereof. Similarly, the target file population for a given backup transaction may be configurable according to a schedule. For example, system files may be assumed to be relatively static in nature and are accordingly backed up once a week, whereas data files may be assumed to change more dynamically and accordingly are backed up daily. It will be appreciated that the target population and backup schedule may be configurable via backup client application 25 and/or backup manager 130.

Backup manager computes (step 230) the delta-score for the backup transaction in accordance with the scoring rules loaded in step 210. If the delta-score computed in step 230 is less than a defined threshold (step 240), i.e., the delta-score does not appear to indicate that the target computer system (e.g., client computing device 20) is infected with ransomware, the backup transaction may be considered successful and process 200 ends.

It will be appreciated that as per the depiction of step 220 in FIG. 4, all of the backup data for a complete backup transaction may be received by backup manager 130 prior to scoring, i.e., the execution of step 230. However, it will be appreciated that in practice, depending on the configuration of backup manager 130, steps 220, 230, and 240 may be performed repetitiously as individual files and/or file locations are backed up. In such a case, process 200 may be performed as a series of sub-processes or routines, each of which may end individually if its associated delta-score is low enough to successfully pass through step 240. It will therefore be appreciated that each backed up file in a backup transaction may impact the overall score of the backup transaction. It will similarly be appreciated that the overall score may all also be employed at the end of the series of processes or routines to determine whether some or all of the backed up files are infected.

If the delta-score computed in step 230 is not less than the defined threshold (step 240), i.e., the delta-score appears to indicate that the target computer system (e.g., client computing device 20) is infected with ransomware, backup manager 130 may alert (step 250) an authorized user of client computing device 20 regarding the likelihood of infection. As described hereinabove, depending upon the configuration of backup manager 130, this alert may be in the form of an email, an IM message, a text message, etc.

Backup manager 130 may be configured to perform one or more response actions 260. For example, backup manager 130 may be configured to receive (step 261) instructions from the authorized user regarding actions to perform. Such instructions may be input via UI module 135 (FIG. 3). Depending on the configuration of backup manager 130, backup manager 130 may wait to receive such instructions before proceeding. Alternatively, backup manager 130 may be configured to wait for a pre-defined length of time to receive instructions, and if the instructions are not received, to autonomously perform one or more additional response actions 260 as a function of the computed delta-score and/or its component factors. Alternatively, backup manager 130 may be configured to autonomously perform one or more additional response actions 260 as a function of the computed delta-score and/or its component factors unless instructed to do otherwise in the instructions received in step 261.

For example, backup manager 130 may quarantine (step 262) the backup transaction, i.e., to save the data from the transaction separately without integrating it within the overall context of regularly scheduled backup transactions.

Alternatively, or in addition, backup manager 130 may restore (step 263) to client computing device 20 some or all the files in the transaction from a baseline version stored in backup database 140 (FIG. 3), either autonomously, or in accordance with instructions received from an authorized user. It will be appreciated that ransomware typically attacks data files, as opposed to system and application files. The rationale for such behavior is that while replacement copies of an operating system and/or an off-the-shelf software application may be assumed to be readily available, data files such a user's personal documents and media images may be unique with no readily available replacements. Accordingly, in some cases, backup manager 130 may be configured to restore only data files. Alternatively, backup manager may be configured to restore system files and/or application files as well in an effort to help remove the ransomware infection. It will be appreciated that prior to performing step 263 system 1 and/or the authorizing user may take steps to eradicate the indicated infection on client computing device 20.

Backup manager 130 may determine the baseline version to be used for restoration according to a number of criteria. For example, the baseline version may be the files from the previous backup transaction. However, it will be appreciated that the previous backup transaction may have also been infected (although the infection may not yet have been as widespread during the previous backup transaction). Accordingly, backup manager 130 may determine the baseline version based at least in part on a historical trend in delta-scores. For example, while the delta-score for the previous transaction, $T_{-1}$, may not have been sufficiently high to indicate (in and of itself) an infection, it may still have been higher than the delta-score for transaction $T_{-2}$, i.e., the transaction that preceded $T_{-1}$. The difference between the delta scores for transactions $T_{-1}$ and $T_{-2}$ may indicate that the infection actually began prior to $T_{-1}$. In such manner, backup manager 130 may identify a change in the historical trend of delta-scores and determine which of the stored transactions $T_n$ to use as the baseline version.

Alternatively, or in addition, backup manager 130 may also add (step 264) backup generations, i.e., increase the number of versions stored in backup database 140. For example, backup manager 130 may be configured to use an exemplary rotation of five daily backups, such that when the backup data from each transaction is saved, the data from five days earlier is deleted. Backup manager 130 may increase the rotation to six, seven, or more days in order to increase the likelihood of recovery from infection. It will be appreciated that backup manager 130 may support other configurations.

Alternatively, or in addition, backup manager 130 may verify (step 265) the file types of some or all of the files in backup transaction. It will be appreciated that when ransomware encrypts a file it generally does not change the file name. Accordingly, the file type of the now encrypted file may still be identifiable according to its filename extension, e.g., ".docx" for Microsoft Word® files, or ".pptx" for Microsoft Excel® files. Backup manager 130 may attempt to verify that the "file signature" of the file in question conforms to an expected, known structure for the file-type indicated by the filename extension as described hereinabove. Failure to verify in step 265 may be considered as a further indication that at least a non-verified file may be infected. Backup manager 130 may delete non-verified files from a backup transaction. Alternatively, or in addition, backup manager 130 may quarantine the files of the entire backup transaction (as per step 262) and/or initiate a restore from a baseline version (as per step 263). Backup manager 130 may also alert the authorized user (as per step 250) regarding the results of step 265 and act in accordance with instruction(s) received from the user.

Alternatively, or in addition, file manager 130 may discard (step 266) the entire backup transaction, i.e., delete the data from the backup transaction.

It will be appreciated by those of skill in the art that the order of the steps of process 200 may be exemplary; other processing flows providing generally the same functionality may also be supported by the present invention. Particularly, steps 210 and 220 may be reordered within the scope of the embodiments described herein; steps 250 and 260 may be reordered within the scope of the embodiments described herein; and steps 261, 262, 263, 264, 265, and 266 may be re-ordered within the scope of the embodiments described herein.

It will be appreciated that backup manager 130 is also configured to provide file restore functionality upon user request without specific regard to an indication of ransomware infection. However, it will also be appreciated that it is possible that infected files were backed up in a previous backup transaction without being detected during process 300. In accordance with embodiments described herein, backup manager 130 may be configured to perform file type verification on some, or all files that have been requested for file restoration. Backup manager 130 may be configured to abort a restore operation if such verification is unsuccessful.

Backup manager 130 may also be configured to receive regular updates of request footprints and/or ransom notes (as described hereinabove) known to be associated with ransomware infection. Backup manager 130 may use such updates to check files associated with a file restore request, and abort a restore operation if such a request footprint or ransom note is found in the target population of the file request. Accordingly, system 1 may be configured to accept specific rules regarding new ransomware software or variants. For example, system 1 may be implemented with an application programming interface (API) to facilitate the use of plugin modules to add or modify scoring rules.

It will be appreciated by one of ordinary skill in the art that while the embodiments herein have been described in the context of detection of, and recovery from, ransomware infection, the system and methods described may also facilitate the detection of, and recovery from, viruses and malware that attack target computing systems without the element of ransom. It will similarly be appreciated that while the target population for ransomware may tend to be (although not necessarily exclusively) user data and media content files, viruses and malware tend to target (although not necessarily exclusively) system and executable files.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for ransomware-aware file backup, the method implemented on a computing device and comprising:
   backing up a target population of files from a target file location in a backup transaction;
   computing a backup delta score for said backup transaction, wherein said computing comprises comparing backup data from said backup transaction with backup data from a previous backup transaction;
   determining whether said computed backup delta score exceeds a pre-defined threshold, wherein said computed backup delta score exceeds the pre-defined threshold when identifying a single ransom note file known to be associated with ransomware; and
   upon said computed backup delta score exceeding said pre-defined threshold:
      determining that said backup transaction is indicative of a ransomware infection, and
      performing at least one counter-measure in response to said ransomware infection by verifying a file-type for at least one file from said target population as a function of conformance to an expected known structure for a file-type indicated by a filename extension of said at least one file.

2. The method according to claim 1, wherein said performing comprises:
   aborting said backup transaction.

3. The method according to claim 1, wherein said performing comprises:
   quarantining said backup transaction.

4. The method according to claim 1, wherein said performing comprises:
   restoring said target population from a previous baseline version of said backup transaction.

5. The method according to claim 1, wherein said performing comprises:
   increasing a number of versions of said backup transaction stored on said computing device.

6. The method according to claim 1, further comprising:
   alerting a user in response to said ransomware infection;
   receiving instructions in response to said alerting; and
   responding to said ransomware infection at least in accordance with said instructions.

7. The method according to claim 1, wherein said performing is performed autonomously.

8. The method according to claim 1, wherein said computing further comprises:
   weighting said backup delta score in accordance with a designated importance of said files.

9. The method according to claim 8, wherein said designated importance is a function of at least one of file type, file location, file function, or past modification history.

10. The method according to claim 8, wherein said weighting comprises:
    enabling designation of at least one of said files as important.

11. The method according to claim 1, wherein said comparing further comprises:
    comparing numbers of file deletions and modifications in said backup transaction and said previous backup transaction.

12. The method according to claim 1, wherein said computing further comprises:
    detecting file access patterns associated with ransomware.

13. The method according to claim 1, wherein said computing further comprises:
    increasing said backup delta score for unsuccessful verification of said file-type for said at least one file.

14. The method according to claim 1, further comprising:
    alerting a user upon cancellation or non-successful completion of said backing up.

15. An intelligent backup server comprising:
    a processor;
    an I/O module operative to receive a target population of files to be backed up from a target file location;

a backup database operative to store one or more versions of said files;
a rules database; and
a backup manager application, to be executed by said processor and configured to:
  backup said files to be backed up in a backup transaction stored in said backup database,
  score a likelihood of infection of one or more of said files in said backup transaction according to rules in said rules database to produce a scored likelihood of infection,
  compute a backup delta score for said backup transaction by comparing said scored likelihood of infection by an unauthorized software agent with a previously scored likelihood of infection by an unauthorized software agent from a previous backup transaction,
  determine whether said computed backup delta score exceeds a pre-defined threshold, wherein said computed backup delta score exceeds the pre-defined threshold when identifying a single ransom note file known to be associated with ransomware, and
  upon said computed backup delta score exceeding said pre-defined threshold:
    determine that said backup transaction is indicative of an infection by an unauthorized software agent, and
    perform at least one counter-measure in response to said infection by verifying a file-type for at least one file from said target population as a function of conformance to an expected known structure for a file-type indicated by a filename extension of said at least one file.

16. The intelligent backup server according to claim 15, wherein:
  said rules database is configured to receive updates for said rules; and
  said backup manager application is configured to:
    receive a request to restore at least one of said files from said backup transaction,
    rescore said scored likelihood of infection using said updates to produce a rescored likelihood of infection,
    recompute said backup delta score for said rescored likelihood of infection to produce a recomputed delta score, and
    perform or not perform said restore based on said recomputed delta score.

17. The intelligent backup server according to claim 15, wherein said backup manager application is further configured to:
  send an alert to a user in response to said likelihood of infection;
  receive instructions in response to said alert; and
  perform said at least one counter-measure in accordance with said instructions.

18. A non-transitory computer-readable storage media encoded with software comprising computer executable instructions which, when executed by a processor, cause the processor to:
  back up a target population of files from a target file location in a backup transaction;
  compute a backup delta score for said backup transaction by comparing backup data from said backup transaction with backup data from a previous backup transaction;
  determine whether said computed backup delta score exceeds a pre-defined threshold, wherein said computed backup delta score exceeds the pre-defined threshold when identifying a single ransom note file known to be associated with ransomware; and
  upon said computed backup delta score exceeding said pre-defined threshold:
    determine that said backup transaction is indicative of a ransomware infection, and
    perform at least one counter-measure in response to said ransomware infection by verifying a file-type for at least one file from said target population as a function of conformance to an expected known structure for a file-type indicated by a filename extension of said at least one file.

19. The non-transitory computer-readable storage media of claim 18, wherein the instructions further cause the processor to:
  abort said backup transaction;
  quarantine said backup transaction;
  restore said target population from a previous baseline version of said backup transaction; or
  increase a number of versions of said backup transaction.

20. The non-transitory computer-readable storage media of claim 18, wherein the instructions further cause the processor to:
  weight said backup delta score in accordance with a designated importance of said files.

* * * * *